(12) United States Patent
Billi et al.

(10) Patent No.: US 6,837,180 B2
(45) Date of Patent: Jan. 4, 2005

(54) ANIMAL WASTE RECEPTACLE HAVING VIBRATION DIRECTED FLOW

(76) Inventors: Ron Billi, 2160 Duckwalk Ct., Waldorf, MD (US) 20602; Craig Horton, 2081 Marino Way, Ventura, CA (US) 93003-6841

( * ) Notice: Subject to any disclaimer, the term of this patent is extended or adjusted under 35 U.S.C. 154(b) by 0 days.

(21) Appl. No.: 09/850,548

(22) Filed: May 7, 2001

(65) Prior Publication Data

US 2002/0162514 A1 Nov. 7, 2002

(51) Int. Cl.[7] .................................................. A01K 1/01
(52) U.S. Cl. ...................................... 119/166; 119/161
(58) Field of Search .......................... 119/161, 165–168; 134/117–119; 15/94; 366/110, 111, 113, 114, 128

(56) References Cited

U.S. PATENT DOCUMENTS

| | | | | |
|---|---|---|---|---|
| 2,882,024 A | * | 4/1959 | Behrens et al. | 366/114 |
| 3,155,092 A | * | 11/1964 | McNair | 601/157 |
| 3,566,837 A | * | 3/1971 | Denham | 119/452 |
| 3,633,321 A | * | 1/1972 | Rise | 451/327 |
| 3,693,298 A | * | 9/1972 | Ferrara | 451/327 |
| 3,710,980 A | * | 1/1973 | Henry | 222/267 |
| 3,840,923 A | * | 10/1974 | Bos | 5/499 |
| 4,018,009 A | * | 4/1977 | Leliaert | 209/243 |
| 4,148,725 A | * | 4/1979 | Haight | 209/481 |
| 4,167,341 A | * | 9/1979 | Doyel | 366/114 |
| 4,428,161 A | * | 1/1984 | Walther et al. | 451/327 |
| 5,048,464 A | * | 9/1991 | Shirley | 119/166 |
| 5,107,797 A | * | 4/1992 | LaRoche | 119/163 |
| 5,931,119 A | * | 8/1999 | Nissim et al. | 119/163 |
| 6,079,364 A | * | 6/2000 | Tamba | 119/163 |
| 6,138,609 A | * | 10/2000 | Gordon | 119/166 |
| 6,202,595 B1 | * | 3/2001 | Atcravi | 119/165 |
| 6,261,154 B1 | * | 7/2001 | McEneny | 451/32 |
| 6,417,589 B1 | * | 7/2002 | Kuyama et al. | 310/80 |

* cited by examiner

Primary Examiner—Michael J. Carone
Assistant Examiner—Kimberly S. Smith (57) ABSTRACT

An method and apparatus for receiving and mixing a portion of animal waste material and sand includes a receptacle capable of allowing an animal to enter therein and receiving a portion of animal waste material; and a vibrating motor communicating with the receptacle for causing the animal waste material to move in a predetermined path. A removable trap for receiving and retaining at least a portion of the animal waste material may be located in the predetermined path. A catcher may be applied to communicate with the sand and animal waste material for receiving and retaining at least a portion of the animal waste material while the vibrating motor is operating.

7 Claims, 9 Drawing Sheets fig 1 fig 2 fig 4 fig. 6 fig 8

ANIMAL WASTE RECEPTACLE HAVING VIBRATION DIRECTED FLOW

BACKGROUND OF THE INVENTION

The present invention relates to animal waste receptacles. More specifically, but without limitation, the present invention relates to feline waste receptacles for receiving and retaining both solid and liquid wastes. Such devices are commonly known as "cat boxes". It is often desirable to house animals, such as cats, inside human dwellings or other enclosures such as animal hospitals, animal shelters, animal pounds or the like. When a cat desires to eliminate waste materials in the form of urine and/or fecal matter, a receptacle having a quantity of material, such as sand, is commonly provided. Such receptacles usually include a bottom with upwardly facing sides. The bottom may be square, round, rectangular, oval or other shape. The top is open to provide entry/exit for the cat. After elimination is completed, the cat usually attempts to scrape the sand with a paw to move a portion of the sand over the waste material thereby burying or "covering" the waste material. If the covering is successful, the now buried fecal and urine matter initially emits little or no odor. If unsuccessful, an offensive odor is immediately emitted. In addition, as the natural biodegradation of the excreted matter progresses and as the cat box is continually used, odors become prominent and highly offensive, as many cat owners can attest. Soon, the urine soaked sand and fecal matter must be removed, usually by an unhappy owner and eventually the sand must be discarded and renewed—a most unpleasant task.

There have been many attempts to produce improved cat boxes. These improvements attempt to, for example, reduce odors and/or to remove the offending fecal matter from the box.

One such device, described in U.S. Pat. No. 5,477,812 to Waters, discloses a comb to move fecal matter into a disposal receptacle after each usage.

Another device, described in U.S. Pat. No. 5,048,465 to Carlisi, discloses a litter box having a moving and upwardly rotating rake to move solid waste material into a storage tray.

Another device described in U.S. Pat. No. 5,509,379 to Hoeschan, discloses a rotating cylinder for separating animal litter from waste material.

Still another device described in U.S. Pat. No. 5,517,947 to Christman, discloses three identical litter trays, nestled together, with openings for sifting the sand from the fecal and urine clumps.

However, none of these attempts provide a device that thoroughly mixes the sand, fecal matter and urine by vibrations to reduce odors and extend the time between cleanings and provide, if desired, a trap for automatically retaining waste products therein for selected disposal.

SUMMARY OF THE INVENTION

Accordingly, the preferred embodiment of the present invention provides a receptacle for receiving and retaining a portion of cat litter (i.e. sand) and for allowing an animal to enter and deposit waste material (both solid and liquid) therein; and a vibrating motor attached to the receptacle for causing the sand and waste material to move in a predetermined (i.e. flow) path. The movement (mixing) of the sand not only reduces the puddling of urine in the bottom portions of the receptacle and speeds up the dehydration process of both the urine soaked sand and solid (fecal) matter but also allows the solid waste material to be collected, if desired. As a result, offensive odors are reduced and the useful life of the sand is increased. This embodiment includes no parts, moving or otherwise, inside the receptacle.

The present invention may also include a trap located in the predetermined (i.e. flow) path of the sand and waste material for receiving and retaining, in the trap, at least a portion of the solid waste material in the receptacle. The trap is preferably attached proximate one end of the receptacle and may be removable to facilitate cleaning of the trap.

Another embodiment of the present invention includes a catcher that may be placed in the receptacle when it is desired to collect and remove the fecal matter contained in the receptacle. The catcher is placed in the receptacle (the center is preferred), the vibrating motor turned on, and the action of the moving sand causes the catcher to collect and retain at least a portion of the fecal matter located in the receptacle. After collection, the catcher, with fecal matter therein, may be removed, cleaned and reused. The catcher, with fecal matter therein, may also be disposed of and a new catcher used at the time of the next cleaning.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
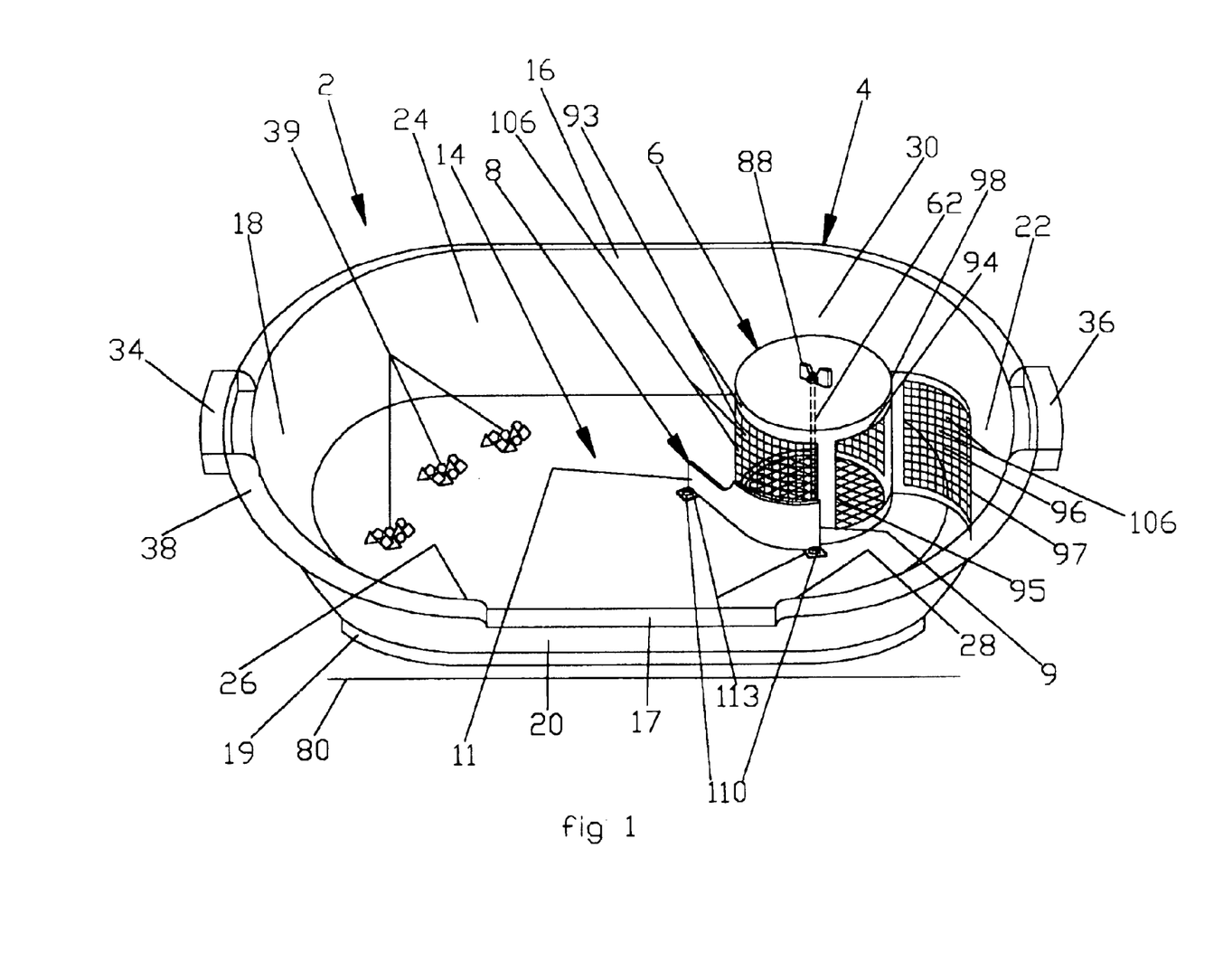
FIG. 1 is a perspective view of the top and front of the present invention.
Figure 2:
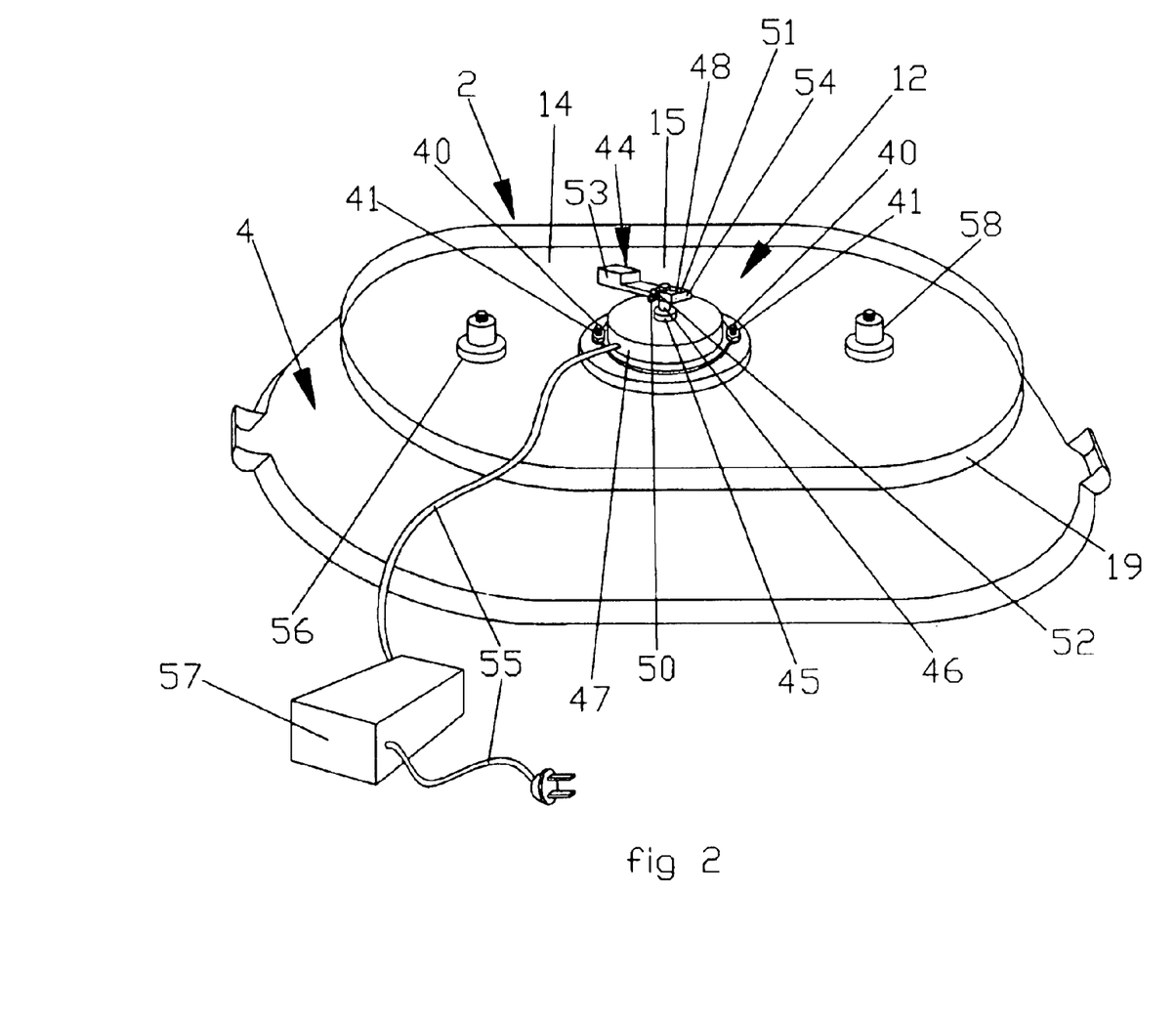
FIG. 2 is a perspective view of the bottom and back of the present invention.
Figure 3:
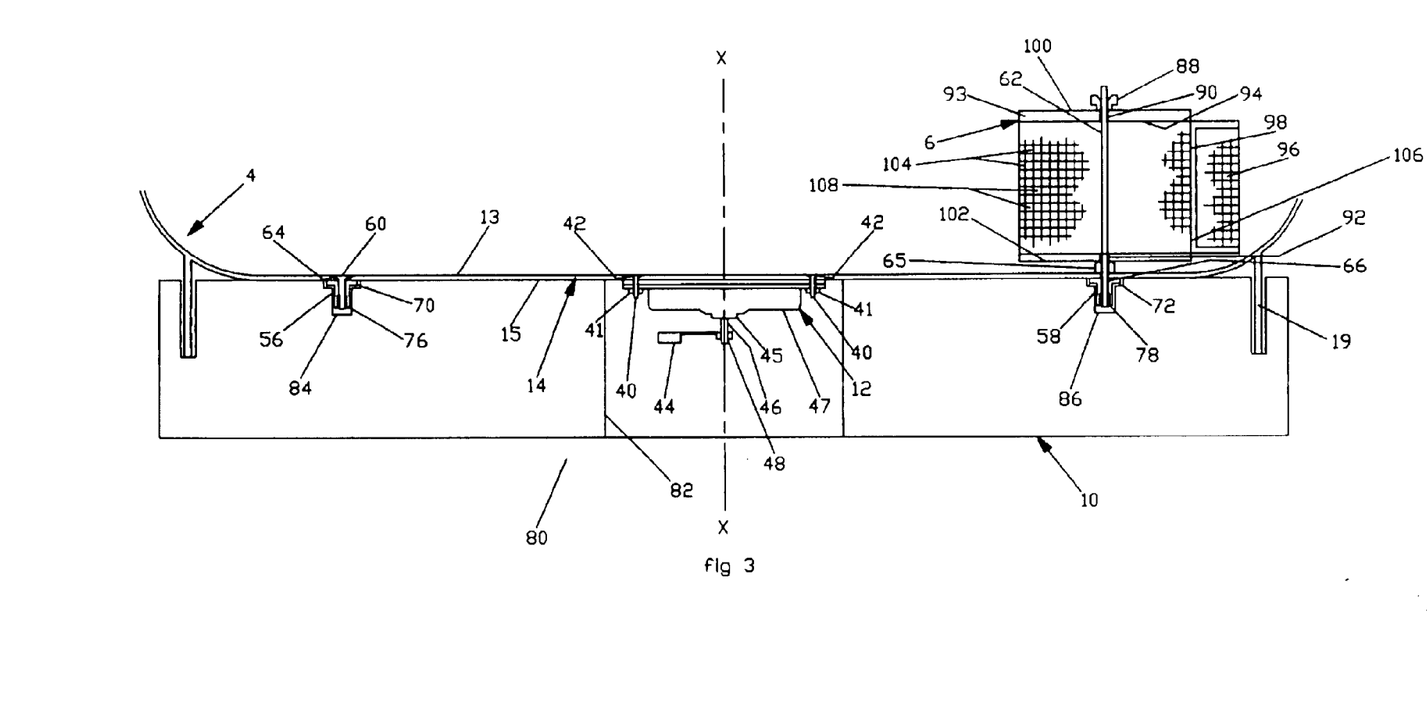
FIG. 3 is a x-section of the present invention.

The preferred embodiment of the present invention is illustrated by way of example in FIGS. 1 to 8. As shown in FIGS. 1, 2 and 3, the animal waste receptacle 2 of present invention includes receptacle 4, trap 6, baffle 8, base 10 and vibrating motor 12.

Figure 4:
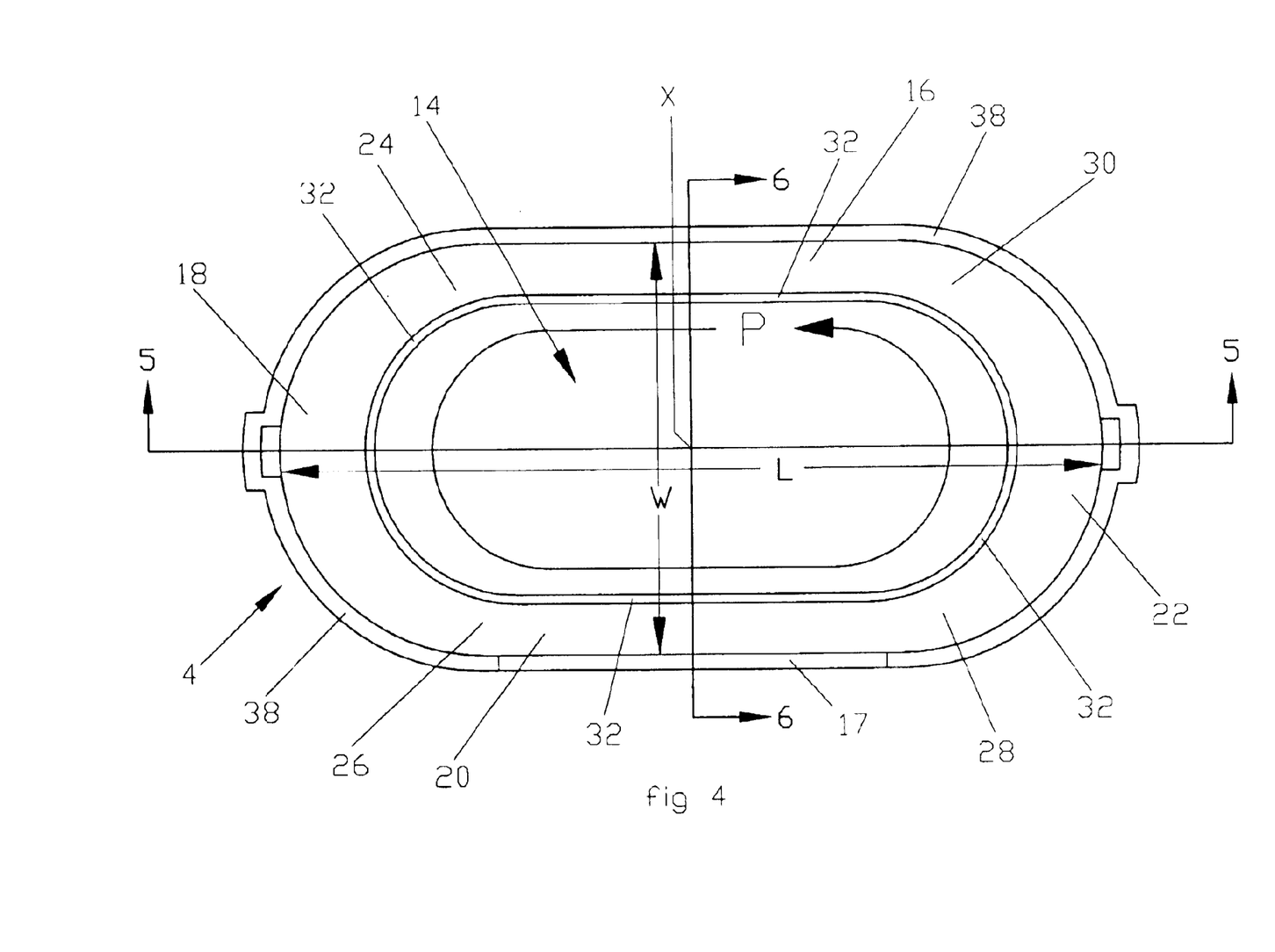
FIG. 4 is a top view of the present invention.
Figure 5:
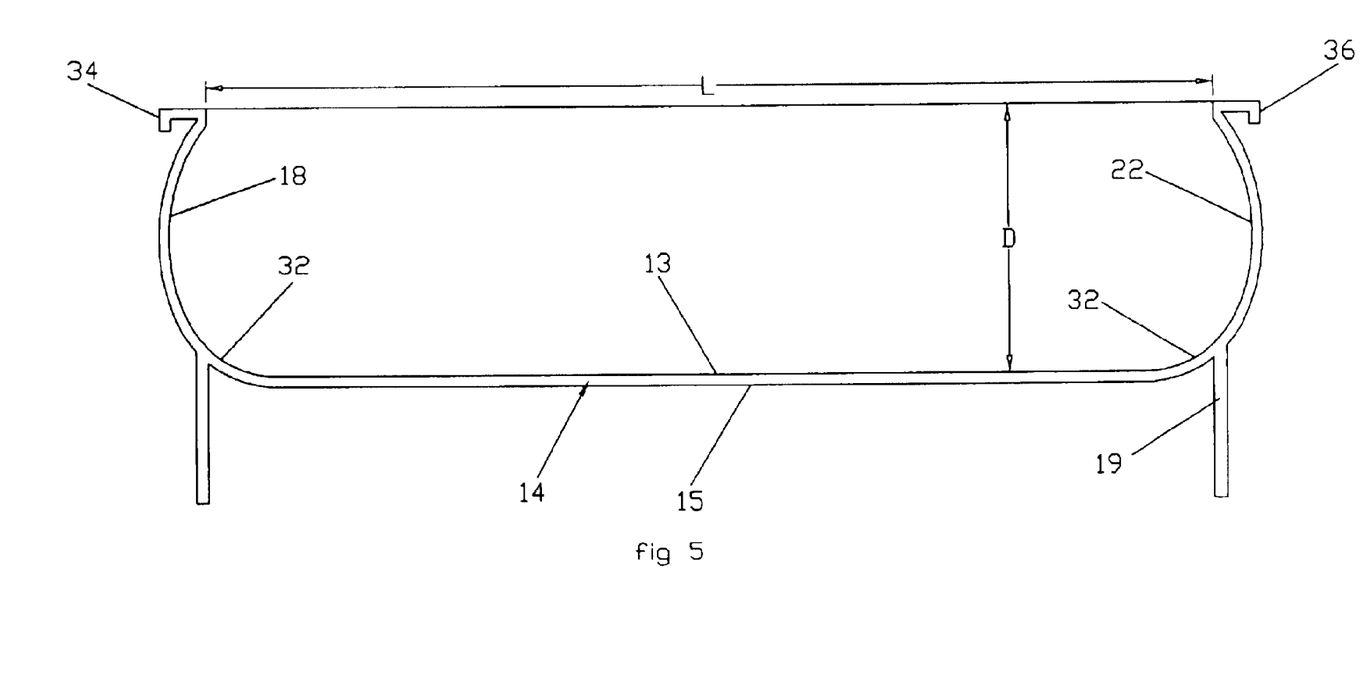
FIG. 5 is x-section of the present invention taken along line 5—5 of FIG. 4.
Figure 6:
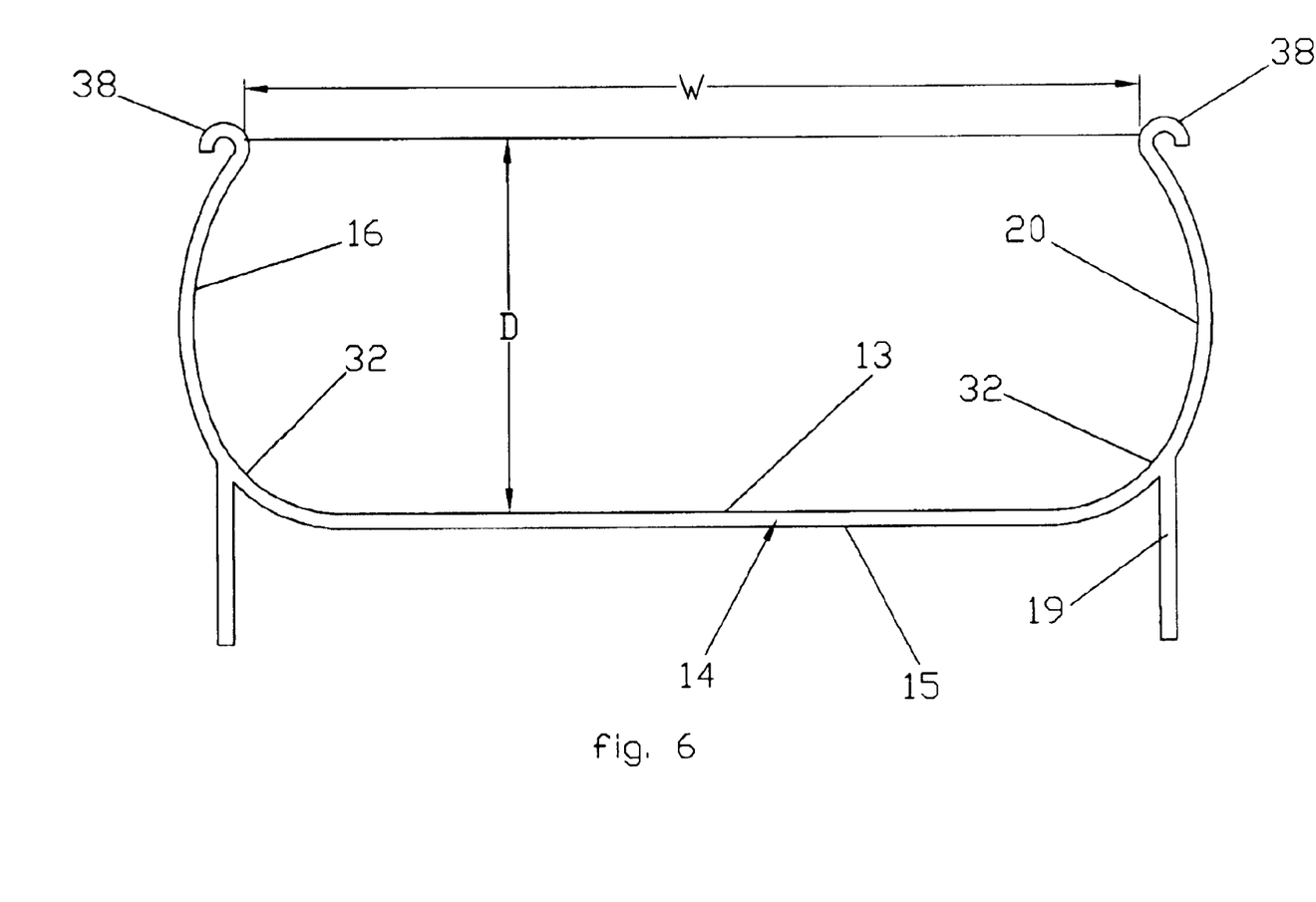
FIG. 6 is a x-section of the present invention taken along line 6—6 of FIG. 4.

Receptacle 4 includes bottom 14, first side 16, first end 18, second side 20 and second end 22. As shown in FIGS. 5 and 6, sides 16 and 20 and ends 18 and 22 have an upwardly extending concave shape and are attached to bottom 14 via curved transition 32. FIG. 4 shows the preferred, elongated shape of receptacle 4 with generally straight sides 16 and 20 and curved ends 18 and 22. The 1 to w ratio (1/w) of the preferred embodiment (see FIGS. 5 and 6) is approximately 1.5 the preferred length approximately 24 inches and the preferred width approximately 16 inches. The preferred depth, d, is approximately 5 inches. Although the preferred embodiment of the present invention has an 1 to w ratio of 1.5, receptacle 4 may be other shapes such as oval, round, square, elliptical and/or have other 1 to w ratios. In addition, the upwardly extending ends 18 and 22 and upwardly extending sides 16 and 20, may be curved differently than as shown in FIGS. 5 and 6, for example, curving outwardly or inwardly, as desired. The sides and ends may also be straight, extending, for example, inwardly, outwardly or vertically. Transition 32 may be more or less curved (or straight) or eliminated altogether, for example, when bottom 14 is joined directly to ends 18 and 22 or to sides 16 and 20. Ends 18 and 22 may have a different curve, c, than as shown in FIG. 4 or be straight. When one or more of sides 16 and 20, ends 18 and 22 or bottom 14 is/are altered, transitions 24, 26, 28 and 30 and transition 32 may be suitably altered to effect the desired shape. It should be noted that sides 16 and 20 and ends 18 and 22 are high enough and curved enough so that when an animal, such as a cat, is eliminating waste material in the form of urine (liquid) and/or fecal (solid) matter in receptacle 4, the buttocks of the animal will contact or be below lip 38 thereby positioning the buttocks in a spaced relationship with either one of the sides 16 or 20 or ends 18 or 22. In this way, any waste material will be better deposited inside of receptacle 4 and not upon the sides or ends of receptacle 4 or outside receptacle 4.

Receptacle 4 is preferably made from a plastic material that is impervious to cleaning solutions, acids and other substances that may be commonly encountered in the desired application, such as, ammonia and uretic acid. Other materials may be substituted. Lip 38 extends around the uppermost perimeter of receptacle 4. Grips 34 and 36 are formed in the upwardly portions of ends 18 and 22, respectively. As can be seen in the drawings, receptacle 4 is fashioned to facilitate the entry and exit of an animal, such as a cat by providing a depression 17 in the approximate center of second side 20 (as shown) or first side 16 (not shown). In addition, a top (not shown) such as a canopy may be provided over all or a portion of receptacle 4 for aesthetic or other purposes such as strengthening receptacle 4 from unwanted flexing or for environmental purposes such as preventing entry of rain. A canopy may also function to channel away odors and used in accordance with suitable venting apparatus, such as fan and conduit, if desired.

In operation, receptacle 4 contains a portion of material 39 that communicates with waste material usually deposited directly thereon by an animal. For example, such material 39 may be sand or commercially available natural or synthetic materials commonly referred to as "cat litter". Hereinafter, such materials shall be referred to as "sand".

Figure 9A:
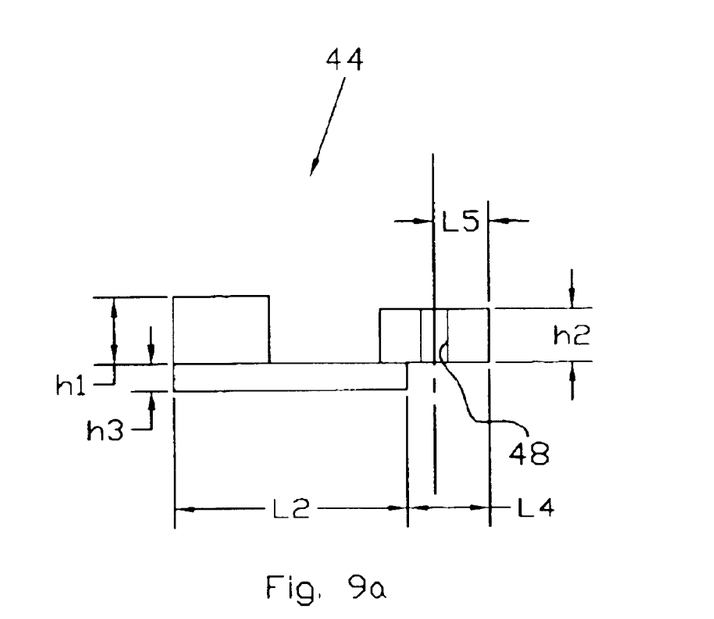
FIG. 9a is a side view of the preferred embodiment of the weight.
Figure 9B:
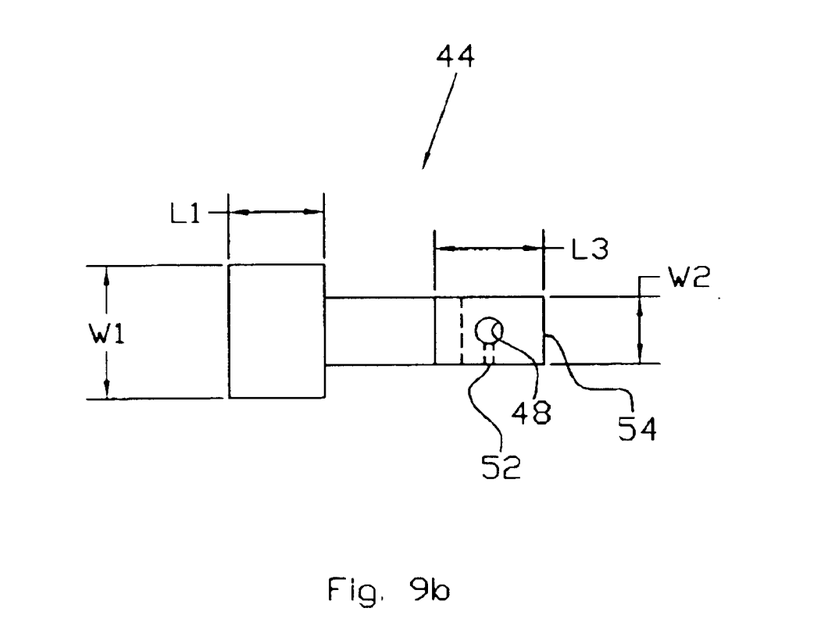
FIG. 9b is a top view of the preferred embodiment of the weight.

Vibrating motor 12 is attached to outside 15 of bottom 14 via bolts 40 and nuts 41, see FIGS. 2 and 3. Bolts 40 are located in countersunk bores 42. Vibrating motor 12 includes shaft 46, bearing 45, weight 44, motor 47 and power cord 55. Power supply 57 provides a preferred 9–14 volts to motor 47. Shaft 46 extends outwardly from bearing 45 and motor 47. Weight 44 includes bore 48 that communicates with shaft 46. Setscrew 50, located in bore 52, secures weight 44 to shaft 46. The preferred embodiment of weight 44 is shown in FIGS. 9a and 9b wherein H1=0.625 inches; H2=0.5 inches; H3=0.25 inches; L1=0.875 inches; L2=1 inch; L3=1 inch; L4=0.75 inches; L5=0.5 inches; W1=1.25 inches; W2=0.625 inches. Weight 44 may be fabricated from a solid piece or from separate pieces and attached, for example, by welding, gluing or other means. Weight 44 is preferably fabricated from a material such as mild steel, SAE 1010 or SAE 1020. Other dimensions may be used and other shapes of weights may be substituted. It should be noted that bore 48 is offset, i.e. located closer to end 51 than to end 53. Such offset and the weight distribution of weight 44 cause vibrating motor 12 to vibrate when in motion thereby causing at least a portion of sand 39 and at least a portion of any waste material in receptacle 4 to be moved in a substantially predetermined path. In the preferred embodiment, such path P (see FIG. 4) is generally around axis X of shaft 46 which is located in the approximate center of bottom 14. Vibrating motor 12, may be located at other locations on the outside 15 or inside 13 of bottom 14 or on the inside or outside of sides 16 or 20 or ends 18 or 22 of receptacle 4. In addition, more than one vibrating motor 12 may be employed. It should be noted that vibrating motor 12 may be operated in a first direction, for example, counterclockwise, as viewed in FIG. 4, thus causing sand 39 and any waste material to move in a first path P, i.e. generally counterclockwise around axis X. Similarly, vibrating motor 12 may be operated in a second direction, for example, clockwise, thus causing sand 39 and any waste material to move in a second path, opposite path P, i.e. generally clockwise around axis X. A suitable and preferred vibrating motor 12 is a low profile (pancake) D.C. motor model number 14-PA090D-24V commercially available from Tripac Corporation, 5703 Crawford Lane, Fort Worth, Tex., 76119. Such motor has the following rated specifications: 24 volt; 2350 rpm plus or minus 300 rpm; 4.2 amps plus or minus 1 amp; reversible; 65 bB(A) 24V no load in clockwise direction; 65 dB(A) 24V no load in counterclockwise direction; steel casing; ball bearing; carbon steel shaft. Other motors may also be used.

Vibrating motor 12 may be operated at different speeds. For example, when vibrating motor 12 is operated at higher speeds (14 volts supplied), sand 39 moves faster. When vibrating motor 12 is operated at lower speeds (9 volts supplied), sand 39 moves slower. In addition, sand 39 tends to maintain a uniform level in receptacle 4 when vibrating motor 12 is operated at lower speeds. It can thus be seen that the speed of vibrating motor 12 may be varied to effect a more uniform depth of sand in receptacle 4. It should be noted that when sand 39 is moving in path P, for example, individual sand particles move relative to one another as well as relative to any waste material present in receptacle 4, thereby effecting a mixing action of the sand and waste material.

In operation, vibrating motor 12 may be operated at higher speeds to mix sand 39 rapidly and move waste material rapidly to be retained in trap 6 (if present). Thereafter, vibrating motor 12 may be operated at slower speeds to effect a more uniform depth of sand in receptacle 4.

It should also be noted that weight 44, shaft 46 and bearing 45 may be attached to receptacle 4 without motor 47. In such a case, motor 47 may be remotely located and may communicate with shaft 46 via chain and sprocket, belt and pulley, gears, magnetic means or by other means known in the art.

Indexer 56 is attached to bottom 14 via screw 60 located in countersunk bore 64 (see FIG. 3). Screw 60 communicates with threaded bore 76. Indexer 58 is attached to bottom 14 via first end of threaded stud 62 located in bore 66 and nut 65. First end of stud 62 communicates with threaded bore 78. Second end of stud 62 communicates with trap 6 which will be hereinafter fully described. Indexers 56 and 58 extend outwardly from bottom 14 and include shoulders 70 and 72, respectively.

Base 10, shown in FIG. 3, is located between receptacle 4 and the desired location of litter box 2, for example, the concrete floor of a garage or the tiled or carpeted floor of a residence (see FIG. 3). It should be noted that such locations are numbered as 80 in the drawings and are referred to as "floor". Base 10 communicates with receptacle 4 and positions receptacle 4 in a spaced relationship with floor 80. Cutout 82 provides clearance for vibrating motor 12 in base 10. Bores 84 and 86 receive indexers 56 and 58, respectively when receptacle 4 is communicating with base 10. In the preferred embodiment, the diameteral clearance between an indexer and its respective bore is approximately 0.25 inch. Base 10 is preferably fabricated from an open cell polyethylene foam having noise and vibration absorbing qualities. Other types of foam or other materials may be substituted, as desired. It has been found that base 10 decreases noise, reduces "skating", that is, the movement of receptacle 10 on floor 80, and provides clearance for vibrating motor 12 from floor 80. Although base 10 is preferred, animal waste receptacle 2 may be operated without base 10. For example, when leg 19 is sufficiently long to position vibrating motor 12 above floor 80 (see FIGS. 5 and 6) or, for example, when other means are employed that eliminate the need to space receptacle 4 a distance above floor 80 or when noise and vibration absorbing qualities are not required. It should be noted that the drawings show leg 19 having different lengths, for example, in FIGS. 1, 2 and 8, leg 19 is shorter than in FIGS. 3, 5 and 6. In addition, FIG. 3 shows leg 19 extending into base 10.

Trap 6 is preferably attached to inside 13 of bottom 14 via stud 62 and wing nut 88. As shown in FIG. 3, stud 62 is located in bores 90 and 92 of trap 6 and in bore 66 of receptacle 4. Trap 6 includes side 93 having opening 94, door 96, pivot 98, top 100 and bottom 102. In the preferred embodiment, trap 6 is approximately 6 inches in diameter and 7 inches high. Door 96 is approximately 4 inches high and 7 inches long. It should be noted that door 96 is approximately the same size as opening 94. Door 96 may be in the open position as shown, for example, in FIGS. 1 and 7, or in the closed position with edge 97 abutting edge 95 (not shown). Side 93, door 96 and bottom 102 are fabricated, for example, from galvanized coated steel wire 104, of preferred diameter 0.035 inch, formed to provide a mesh 108 having approximately 0.5 inch square openings 106. Mesh 108 is commonly referred to as hardware cloth. Openings 106 of 0.5 inch are provided to permit sand 39 to pass through yet retain waste products larger than approximately 0.5 inch. Smaller or larger openings 106 may be used as well as different diameters of wire 104. In addition, the shape of openings 106 may be different, such as, round, rectangular or other shapes.

Vibrating motor 12 causes sand 39 to continuously move in receptacle 4 in a preferred path P substantially around receptacle 4, as shown in FIG. 4. Accordingly, trap 6 is located in path P, preferably adjacent second end 22 (see FIG. 7). When door 96 is in the open position and abutting second end 22, trap 6 and door 96 extend substantially across path P. In this way, sand 39 is caused to pass through trap 6 and door 96 upon every cycle of the sand's rotation around receptacle 4. Accordingly, any waste material will be caused to enter trap 6 and be retained therein.

Figure 7:
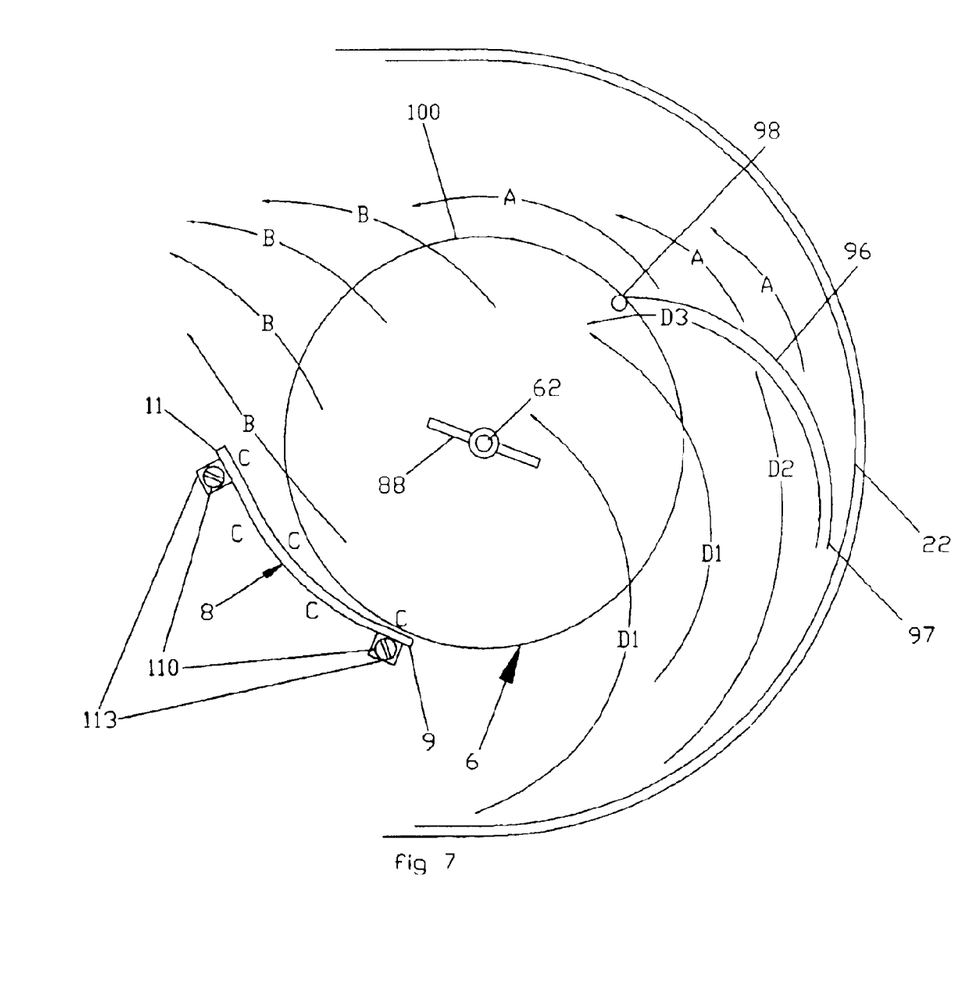
FIG. 7 is a top view of the present invention showing the preferred flow paths proximate the trap.

More specifically, opening 94 and door 96 of trap 6 are positioned and arranged in path P so that edge 97 abuts second end 22, as shown in FIG. 7. When vibrating motor 12 is operating and sand 39 and waste material (if any) are moving in the direction of path P, a first portion of sand 39 and waste material enters trap 6 through opening 94 as indicated by arrows D1 in FIG. 7. A second portion of sand 39 and waste material approach door 96 as indicated by arrows D2 in FIG. 7, wherein a substantial portion of the second portion of sand 39 passes through openings 106 in door 96 and continues in the direction indicated by arrows A (see FIG. 7). Waste material larger than openings 106 is diverted by door 96 along a path indicated by arrow D3 in FIG. 7 and into trap 6. Waste material larger than openings 106 is retained in trap 6 and sand 39 in trap 6 passes through openings 106 in side 93 and continues in the direction indicated by arrows B.

Baffle 8, having first end 9 and second end 11, is attached to receptacle 4 via screws 110 located in bores 112 (not shown) of tabs 113 and through bores 114 (not shown) located in bottom 14. Baffle 8 is positioned and arranged preferably as shown in FIG. 1, with first end 9 proximate edge 95 and abutting side 93 of trap 6. When positioned substantially as shown in FIG. 1, baffle 8 reduces short circuiting of sand 39 in path P and thereby improves the quality of flow characteristics. For example, baffle 8 reduces eddying in the vicinity of trap 6 indicated as C in FIG. 7.

When it is desired to remove waste material retained in trap 6, door 96 is moved so that edge 97 is proximate edge 95. Closing door 96 may be facilitated by operating vibrating motor 12 while applying force to door 96. With vibrating motor 12 off, wing nut 88 is removed and trap 6 is lifted upwardly at a rate sufficient to permit sand 39 to exit trap 6 downwardly through bottom 102. Trap 6 may be discarded and a new one installed or trap 6 may be emptied and reinstalled. Installation may be facilitated by operating vibrating motor 12 while pressing trap 6 downwardly while positioned over stud 62 or by rotating trap 6 back and forth (i.e. clockwise then counterclockwise then repeat as necessary) while pressing downwardly. Wingnut 88 may then be installed and tightened on stud 62.

Another embodiment of the present invention (see FIG. 8) includes receptacle 4, vibrating motor 12, base 10 (if desired) and catcher 120. Catcher 120 includes top 122, handle 124, side 126, first opening 128, second opening 129, wing 130, wing 131 and bottom 132 having openings 134. In the preferred embodiment, catcher 120 is approximately 6 inches high and approximately 6 inches in diameter. Wings 130 and 131 are curved and extend outwardly so that the distance between end 136 and end 137 is approximately the width, w, of receptacle 4. Openings 134 are large enough to permit sand 39 to exit therethrough but small enough to prevent the passage of solid waste material and are preferably 0.5 inches square. First and second openings, 128 and 129 respectively, are approximately 6 inches long and 5 inches high.

Figure 8:
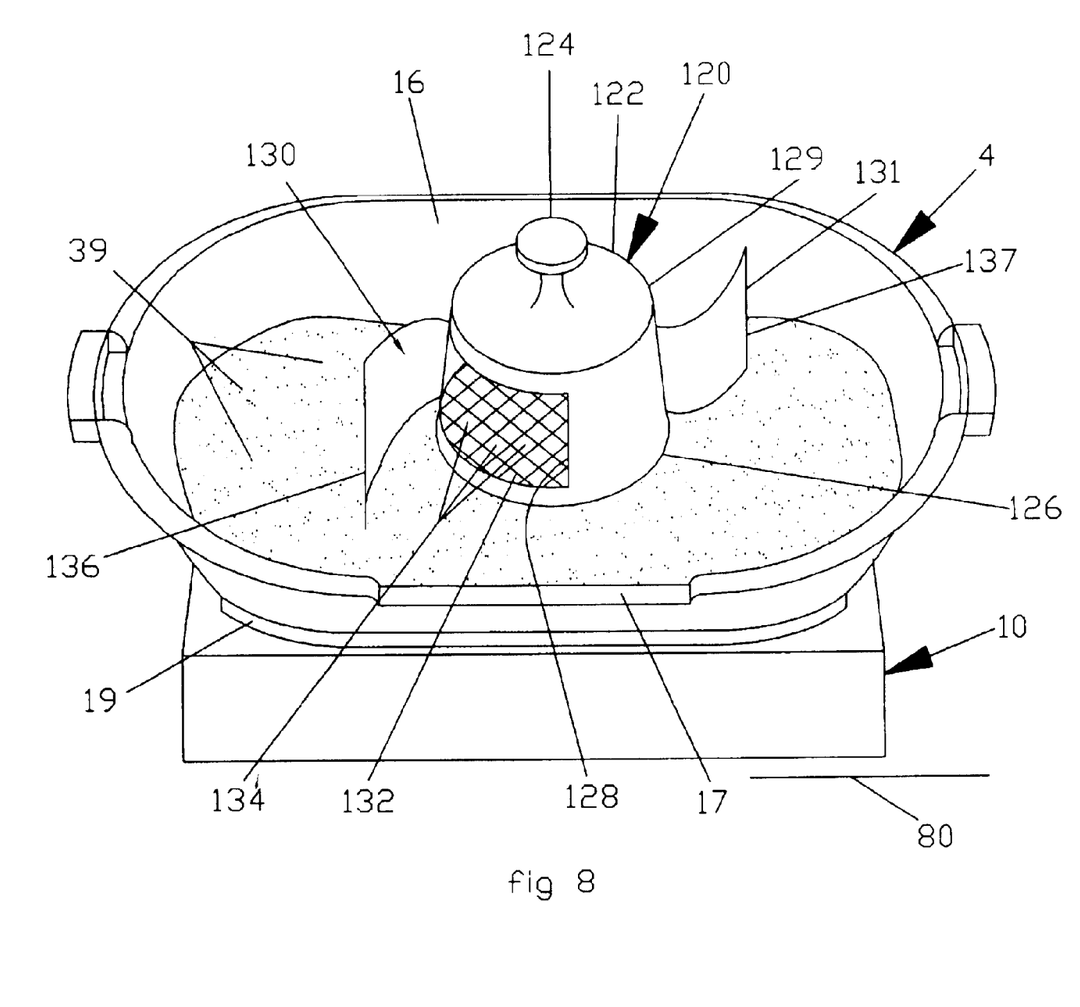
FIG. 8 is a perspective view of an alternate embodiment of the present invention.

In operation, receptacle 4 and vibrating motor 12 are operated in the manner previously described, causing sand 39 and any waste material therein to move in the substantially predetermined path, P. Such operation, moves, mixes and distributes sand 39 and waste material throughout receptacle 4 reducing odors and increasing the useful life of sand 39. When it is desired to remove solid waste material from receptacle 4, catcher 120 is placed at the approximate center of receptacle 4, as shown in FIG. 8, and vibrating motor is started thereby causing sand 39 and any waste material to move in a predetermined path, for example, path P (see FIG. 4). The action of the moving sand, 39, causes catcher 120 to rotate on its own axis and in the same direction as path P and to move downwardly until bottom 132 is located beneath the surface of sand 39. Solid waste material enters both first and second openings 128 and 129 respectively, and remains inside catcher 120.

After the solid waste material is collected inside catcher 120, vibrating motor 12 is stopped and catcher 120 is removed from receptacle 4 by grasping handle 124 and pulling upwardly while maintaining catcher 120 approximately horizontal. Sand 39 exits catcher 120 through openings 134. Solid waste material is retained on bottom 132. Catcher 120 and the solid waste material may both be disposed of or the solid waste material dumped and catcher 120 reused. It should be noted that first and second wings, 130 and 131, are not required but reduce the tendency of solid waste material to remain against first side 16 and second side 20 when traveling in path P. Catcher 120 may be other shapes, such as, square, triangle or rectangular. Wings 130 and 131 also increase the rotational speed of catcher 120.

Obviously, many modifications and variations of the present invention are possible in light of the above teachings. It is therefore to be understood that within the scope of the appended claims, the invention may be practiced other than as specifically described.

What is claimed is:

1. An animal waste receptacle, having a quantity of sand therein, said animal waste receptacle for receiving and mixing waste material and said sand, comprising:
    a) a receptacle having a bottom and upwardly extending sides and ends, said sides and said ends forming a perimeter around the outside of said bottom, said receptacle capable of retaining sand or waste material at any location inside of said perimeter;
    b) a vibrating motor producing vibrations and communicating with said receptacle, said vibrations of said motor causing said sand and said waste material to be directed in a predetermined path around the center of said bottom;
    c) a trap located substantially across said predetermined path, said trap capable of retaining waste material therein, said trap having at least one first opening for permitting said sand and said waste material to enter said trap and said trap having at least one second opening for permitting said sand to exit said trap.

2. The animal waste receptacle defined in claim 1, wherein said trap includes at least one door for closing off said one opening for permitting said waste material and said sand to enter said trap.

3. The animal waste receptacle defined in claim 2, wherein said trap is removably attached to said receptacle.

4. The animal waste receptacle defined in claim 1, further including a base that communicates with said receptacle and positions said receptacle in a spaced relationship with the floor said base including noise and anti-skating qualities.

5. The apparatus defined in claim 1, wherein said trap is removably attached to said receptacle.

6. An animal waste receptacle having a quantity of sand therein, said animal waste receptacle for receiving and mixing waste material and said sand, comprising:
    a) a receptacle having a bottom and upwardly extending sides and ends, said sides and said ends forming a perimeter around the outside of said bottom, said receptacle capable of retaining sand or waste material at any location inside said perimeter;
    b) a vibrating motor producing vibrations and communicating with said receptacle, said vibrations of said motor causing said sand and said waste material to be directed in a predetermined path;
    c) means, located substantially across said predetermined path, for retaining at least a portion of said waste material in said means, said means having at least one first opening for allowing said sand and said waste material to enter said means and said means also including at least one second opening for permitting said sand to exit said means.

7. The apparatus defined in claim 6, wherein said means is removable.

* * * * *